June 22, 1948.  J. M. LAMB  2,443,828
WEED CUTTER AND HOLDER
Filed Aug. 6, 1945

INVENTOR
J. M. LAMB
BY
ATTORNEY

Patented June 22, 1948

2,443,828

UNITED STATES PATENT OFFICE 2,443,828

WEED CUTTER AND HOLDER

John M. Lamb, Salem, Oreg.

Application August 6, 1945, Serial No. 609,205

1 Claim. (Cl. 294—50.6)

This invention relates generally to garden tools and particularly to a weed cutter and holder.

The main object of this invention is to provide a simple form of weed cutter by means of which weeds may be cut off below the surface of the ground and picked up as they are cut off, and held until a number of them are collected.

The second object is to provide a device of the class described which will be simple to manufacture and keep in order, and in which only a minimum amount of skill is required to operate same.

I accomplish these and other objects in the manner set forth in the following specification as illustrated in the accompanying drawing, in which.

Similar numerals refer to similar parts throughout the several views.

Figure 1:
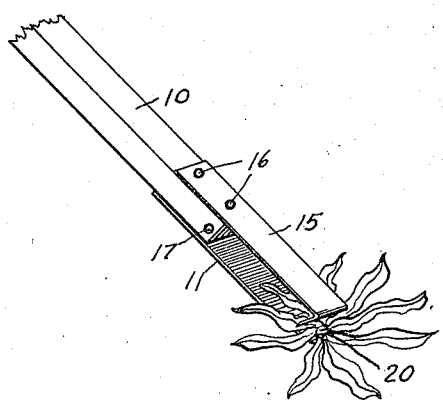
Fig. 1 is a fragmentary perspective view showing the device severing a weed.
Figure 2:
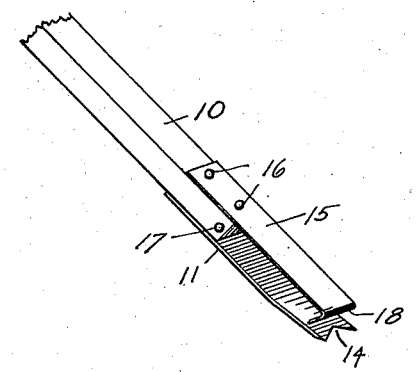
Fig. 2 is a similar view showing the device without the weed.
Figure 3:
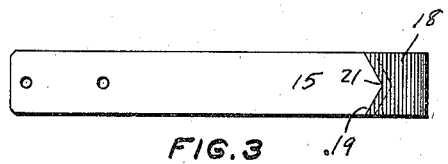
Fig. 3 is a bottom view of the weed holder taken along the line 3—3 in Fig. 7.
Figure 4:
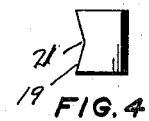
Fig. 4 is an end view of Fig. 3.
Figure 5:
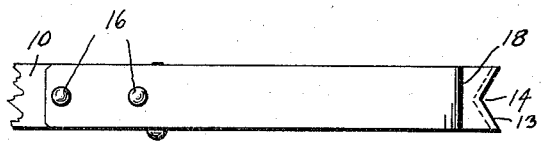
Fig. 5 is a plan of the weed cutting end of the device.
Figure 6:
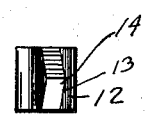
Fig. 6 is an end elevation of Fig. 5.
Figure 7:
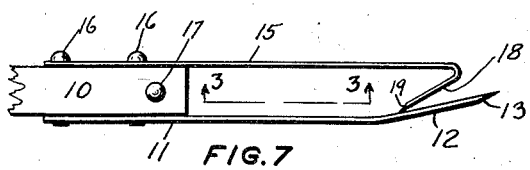
Fig. 7 is a side elevation of Fig. 5.

Referring in detail to the drawing, there is shown a handle 10 preferably of wood, to one end of which is secured a cutting blade 11 whose end 12 is slightly bent as shown and its tip 13 is bevelled and provided with a V-notch 14.

The weed holder 15 is a blade of spring steel which is secured to the handle 10 and the blade 11 by means of the rivets 16. A transverse rivet 17 is employed to keep the handle 10 from spreading. The holder 15 has its end 18 turned backwardly as shown so its point 19 engages the end 12 of the cutting blade 11.

The operation of the device is as follows:

The user merely places the V-notch 14 against the root of the plant 20, holding the handle 10 at an angle from thirty to forty degrees with the horizontal, and with a short jabbing stroke severs the weed 20 and catches it between the blades 11 and 15.

This operation can be repeated until the space between the blades 11 and 15 is filled, and the entire group of weeds can be transferred to a container.

It is desirable to form a V-notch 21 in the end 18 of the weed holder 15 to facilitate the weed holding action thereof as it prevents the weeds from slipping out laterally even though not located at the center line of the blade 15.

I claim:

A weeder of the class described consisting of a square handle member having a cutting blade secured to one side thereof and having the point of said cutting blade bent inwardly a short distance from the end thereof, the end of said blade having a V notch formed therein, a weed holder consisting of a flat spring secured to said handle opposite said cutting blade and having the tip thereof turned backwardly and contacting the bent portion of said cutting blade between this tip and the bend therein.

JOHN M. LAMB.

REFERENCES CITED

The following references are of record in the file of this patent:

UNITED STATES PATENTS

| Number | Name | Date |
|---|---|---|
| 1,619,856 | Davis | Mar. 8, 1927 |
| 1,882,423 | Holz | Oct. 11, 1932 |
| 1,973,417 | Rieff | Sept. 11, 1934 |
| 2,029,155 | Cervenka et al. | Jan. 28, 1936 |
| 2,049,713 | Marshall | Aug. 4, 1936 |